(12) United States Patent
Lim et al.

(10) Patent No.: US 10,750,052 B2
(45) Date of Patent: Aug. 18, 2020

(54) IMAGE FORMING APPARATUS GRANTING ACCESS AND AUTHORIZATION TO CLIENT OR SERVER TO PERFORM REMOTE SUPPORT SERVICE ACCORDING TO LIST OF OPERATIONS SELECTED BY THE IMAGE FORMING APPARATUS

(71) Applicant: HP PRINTING KOREA CO., LTD., Suwon-si, Gyeonggi-Do (KR)

(72) Inventors: Mok-hwa Lim, Suwon-si (KR); Sun-young Park, Suwon-si (KR); Cheol-yon Won, Seoul (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 75 days.

(21) Appl. No.: 15/399,236

(22) Filed: Jan. 5, 2017

(65) Prior Publication Data

US 2017/0195523 A1 Jul. 6, 2017

(30) Foreign Application Priority Data

Jan. 6, 2016 (KR) .......................... 10-2016-0001620

(51) Int. Cl.
*H04N 1/44* (2006.01)
*H04L 29/06* (2006.01)
*H04N 1/00* (2006.01)
*H04L 29/08* (2006.01)
*G03G 15/00* (2006.01)

(52) U.S. Cl.
CPC .......... *H04N 1/4433* (2013.01); *H04L 63/10* (2013.01); *H04L 63/101* (2013.01); *H04L 63/105* (2013.01); *H04L 67/025* (2013.01); *H04L 67/125* (2013.01); *H04N 1/00344* (2013.01); *H04N 1/00925* (2013.01); *H04N 1/00973* (2013.01); *H04N 1/4413* (2013.01); *G03G 15/5012* (2013.01); *G03G 15/5079* (2013.01); *G03G 15/6508* (2013.01); *G03G 15/70* (2013.01); *G03G 2215/00552* (2013.01); *H04L 63/083* (2013.01); *H04N 2201/0094* (2013.01)

(58) Field of Classification Search
None
See application file for complete search history.

(56) References Cited

U.S. PATENT DOCUMENTS

| 2003/0223766 | A1* | 12/2003 | Imai | G03G 15/5083 |
| | | | | 399/8 |
| 2004/0260704 | A1* | 12/2004 | Moore | G06F 3/1204 |
| 2006/0095566 | A1* | 5/2006 | Kanai | H04L 41/00 |
| | | | | 709/224 |
| 2013/0335758 | A1* | 12/2013 | Torii | G06F 3/1294 |
| | | | | 358/1.9 |
| 2015/0181056 | A1 | 6/2015 | Mutsuno | |

\* cited by examiner

*Primary Examiner* — Benny Q Tieu
*Assistant Examiner* — Haris Sabah
(74) *Attorney, Agent, or Firm* — Jefferson IP Law, LLP

(57) ABSTRACT

A method of controlling an image forming apparatus is provided. The method includes requesting a remote support service from a terminal or a server connected to the terminal, receiving a request for an access authorization regarding an operation related to the remote support service from the terminal, granting the access authorization to the terminal based on a user input or a pre-set setting, receiving a control command for the remote support service from the terminal, and executing an operation corresponding to the control command according to the access authorization granted to the terminal.

20 Claims, 8 Drawing Sheets

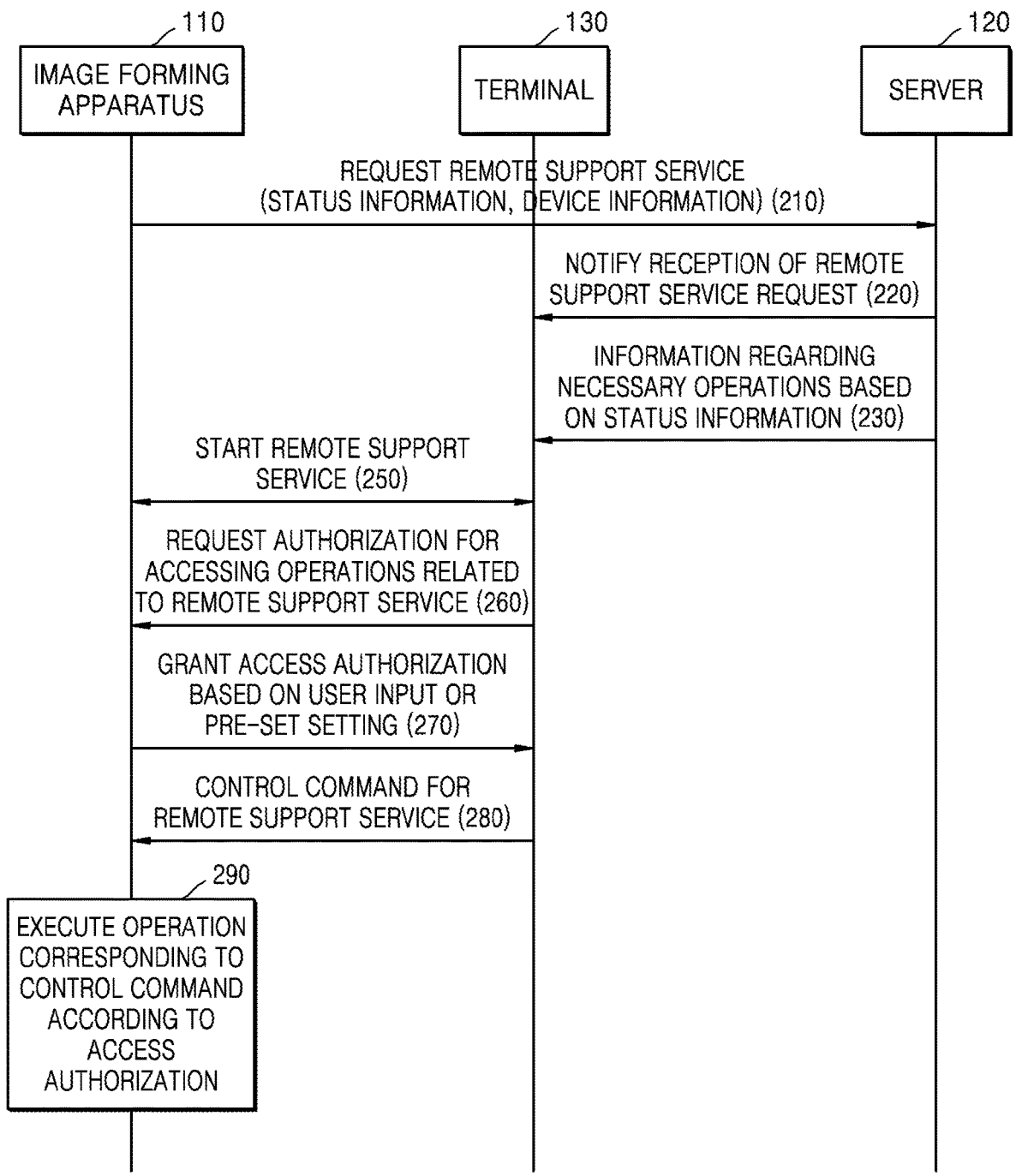

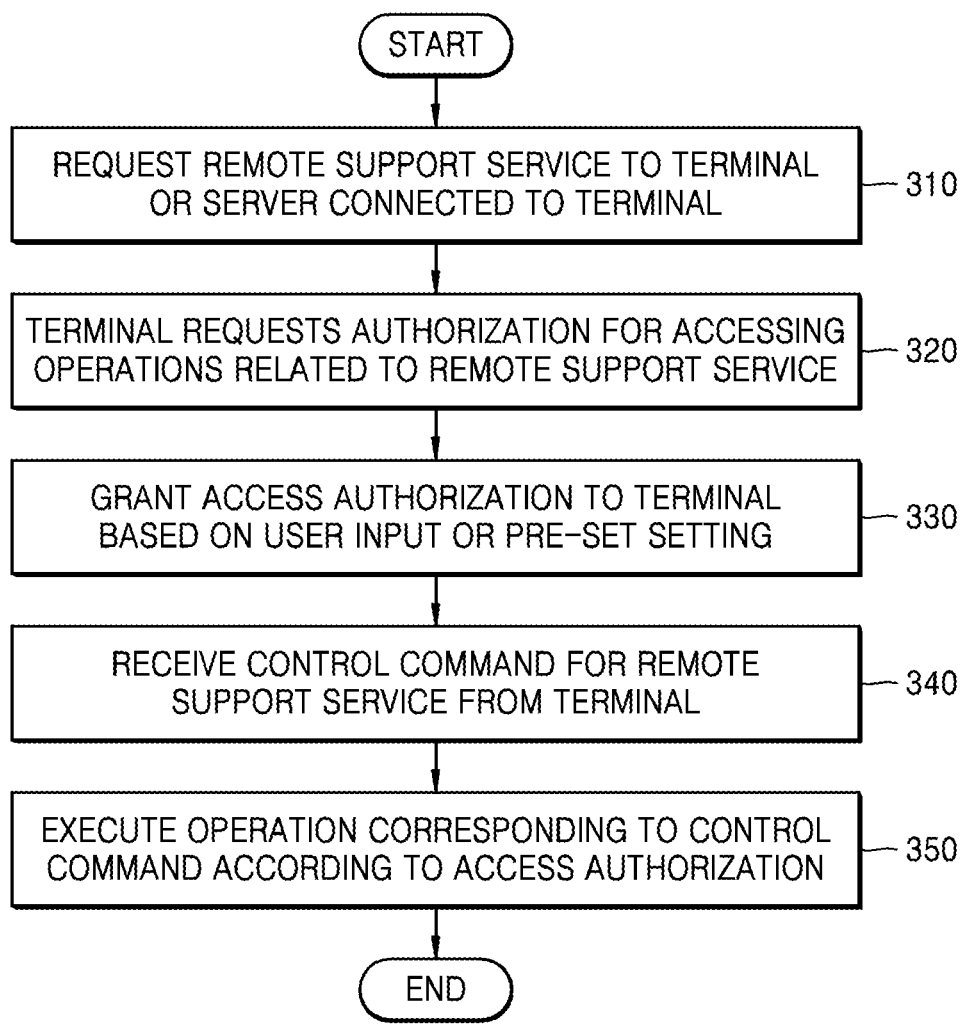

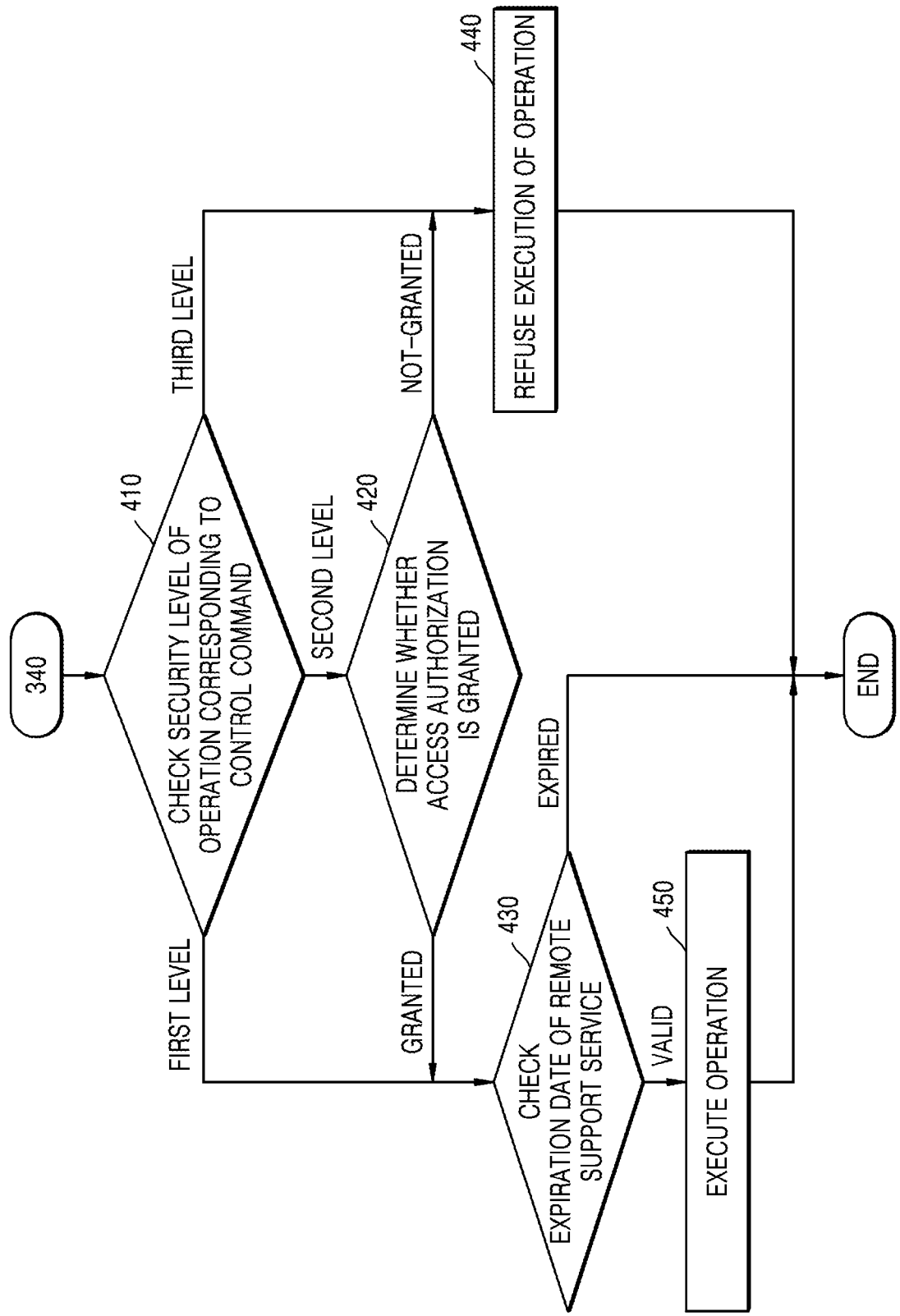

PRIOR CONSENT FOR REMOTE SUPPORT

REQUESTING SERVICE AUTHORIZATION
REGARDING THE BELOW MULTIFUNCTION PRINTER
S/N:WER01239ERWER IP:10.88.199.XXX
EXPIRATION DATE: ~2015.9.10 14:00 (2hours)

☐ User Profile Management   [MODIFY]
☐ Address Book Management
☐ Admin Information Management
☐ Document Box Management
☐ App Management / Feature Management
☐ Job Queue Manage
☐ USB Read Access, USB Wirte Access
☐ Print, Copy, Fax, Scan
☐ Device Settings

[SEND PRIOR CONSENT]   [CANCEL]

PRIOR CONSENT FOR REMOTE SUPPORT

REQUESTING SERVICE AUTHORIZATION REGARDING THE BELOW MULTIFUNCTION PRINTER
S/N:WER01239ERWER IP:10.88.199.XXX
EXPIRATION DATE: ~2015.9.10 14:00 (2hours)

☐ User Profile Management
☐ Address Book Management
☐ Admin Information Management
☐ Document Box Management
☐ App Management / Feature Management
☐ Job Queue Manage
☐ USB Read Access, USB Wirte Access
☑ Print, Copy, Fax, Scan
☑ Device Settings

[APPROVE] [REFUSE]

IMAGE FORMING APPARATUS GRANTING ACCESS AND AUTHORIZATION TO CLIENT OR SERVER TO PERFORM REMOTE SUPPORT SERVICE ACCORDING TO LIST OF OPERATIONS SELECTED BY THE IMAGE FORMING APPARATUS

CROSS-REFERENCE TO RELATED APPLICATION(S)

This application claims the benefit under 35 U.S.C. § 119(a) of a Korean patent application filed on Jan. 6, 2016 in the Korean Intellectual Property Office and assigned Serial No. 10-2016-0001620, the entire disclosure of which is hereby incorporated by reference.

TECHNICAL FIELD

The present disclosure relates to an image forming apparatus and a method of controlling the same.

BACKGROUND

Along with recent developments in electronic communication-related technology and network-related technology, various services utilizing these technologies have been developed and commercialized. According to this trend, image forming apparatuses, such as multi-function printers and printers of the related art, are equipped with communication devices, and a network printing service and a remote support service using the communication device have become available.

Previously, in the case of using a remote support service of an image forming apparatus, a service associate or a service engineer may access a multi-function printer or a printer of the related art of the user via a network from a remote place, directly view screen images displayed at the multi-function printer or the printer of the related art, and take various measurements. At this time, when virtual network computing (VNC) technology is used, the multi-function printer may be controlled without any separate access control, as if the service associate or the service engineer directly uses the multi-function printer.

As described above, when a remote support service mirrors a screen image of an image forming apparatus, all information stored in the image forming apparatus may be directly exposed to a service associate or a service engineer without being filtered. Furthermore, even when a problem is related only to a particular function, authorizations regarding all functions may be granted to a service associate or a service engineer, and thus the image forming apparatus may be controlled regardless of a user's intention. Therefore, the image forming apparatus may be defenselessly exposed to a mistake or malicious remote control, and thus problems such as leakage of personal information and an undesired change of setting of the image forming apparatus may occur.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image forming apparatus enabling a user to grant access authorization to a terminal, which accesses the image forming apparatus to provide a remote support service, according to operations of the image forming apparatus and a method of controlling the image forming apparatus.

In accordance with an aspect of the present disclosure, a method of controlling an image forming apparatus is provided. The method includes requesting a remote support service from a terminal or a server connected to the terminal, receiving a request for an access authorization regarding an operation related to the remote support service from the terminal, granting the access authorization to the terminal based on a user input or a pre-set setting, receiving a control command for the remote support service from the terminal, and executing an operation corresponding to the control command according to the access authorization granted to the terminal.

In accordance with another aspect of the present disclosure, an image forming apparatus is provided. The image forming apparatus includes a transceiver configured to communicate with an external device, a processor configured to request a remote support service from a terminal or a server connected to the terminal, receive a request for an access authorization regarding an operation related to the remote support service from the terminal, grant the access authorization to the terminal based on a user input or a pre-set setting, receive a control command for the remote support service from the terminal, and control the image forming apparatus to execute an operation corresponding to the control command according to the access authorization granted to the terminal, and an image forming task performer configured to perform an image forming operation under the control of the processor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent a from the following description taken in conjunction with the accompanying drawings, in which:

FIG. 2 is a flowchart showing a method of providing a remote support service according to an embodiment of the present disclosure;

FIG. 3 is a flowchart showing a method of controlling an image forming apparatus according to an embodiment of the present disclosure;

FIG. 4 is a flowchart showing a method by which an image forming apparatus executes an operation corresponding to a control command according to an embodiment of the present disclosure;

FIG. 5 is a diagram showing an operation list generating screen image according to an embodiment of the present disclosure;

FIG. 6 is a diagram showing an operation list consent screen image according to an embodiment of the present disclosure;

Throughout the drawings, it should be noted that like reference numbers are used to depict the same or similar elements, features, and structures.

DETAILED DESCRIPTION

Figure 1:
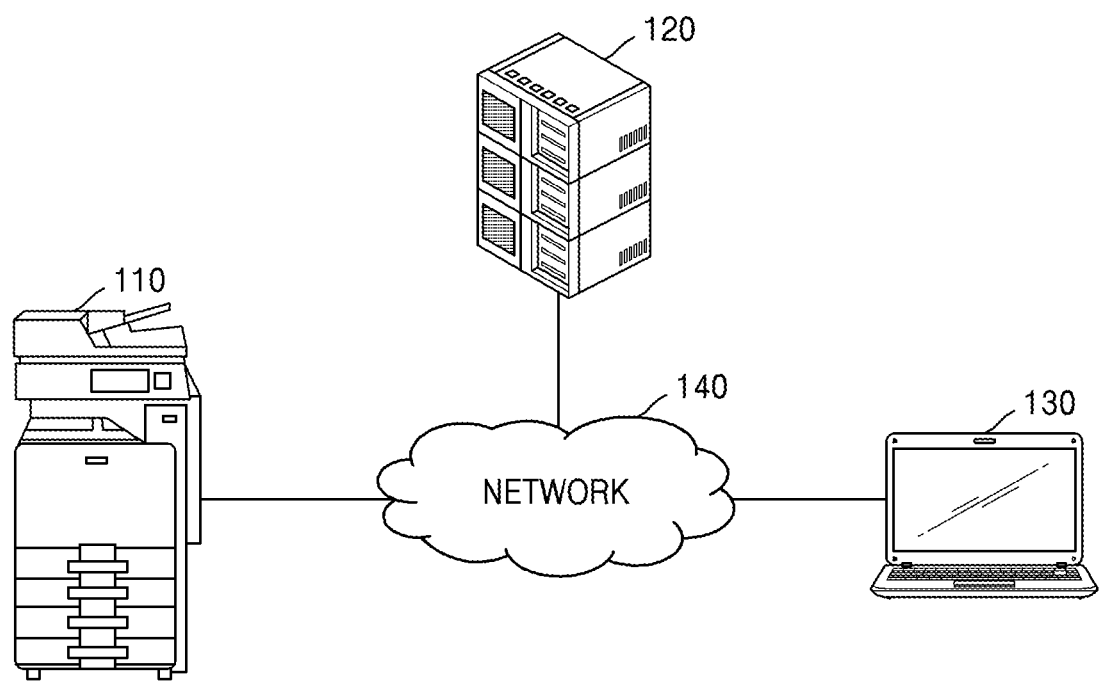
FIG. 1 is a diagram showing a system for providing a remote assistance service according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when a part is referred to as being "connected" to another part, it is not only the case where it is "directly connected", but also the case where it is "electrically connected". Also, throughout the specification, when an element is referred to as "including", it is to be understood that the element may include other elements, unless being stated otherwise. In addition, the term "unit" used in the specification means a software component, a hardware component such as a field-programmable gate array (FPGA) or an application-specific integrated circuit (ASIC), and a "unit" performs a certain function. However, a "unit" is not limited to software or hardware. A "unit" may be configured to be included in an addressable storage medium and may be configured to reproduce one or more processors. Therefore, examples of a "unit" include components including software components, object oriented software components, class components, and task components, processes, functions, attributes, procedures, subroutines, segments of program codes, drivers, firmware, micro-codes, circuits, data, databases, data structures, tables, arrays, and variables. Functions provided in components and "units" may be combined with one another into a smaller number of components and "units" or further separated into additional components and "units".

Hereinafter, various embodiments of the present disclosure will be described with reference to the accompanying drawings, so that those of ordinary skill in the art can readily implement the disclosed embodiments. However, the disclosed embodiments can be implemented in various different forms and are not limited to the embodiments described herein. In order to clearly illustrate the various embodiments disclosed in the drawings, portions not related to the description are omitted.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described at the corresponding part in the description of the present disclosure. Therefore, the terms used in the various embodiments of the present disclosure should be defined based on the meanings of the terms and the descriptions provided herein.

FIG. 1 is a diagram showing a system for providing a remote assistance service according to an embodiment of the present disclosure.

Referring to FIG. 1, a system for providing a remote support service may include an image forming apparatus 110, a server 120, and a terminal 130, where the image forming apparatus 110, the server 120, and the terminal 130 are connected to a network 140.

The image forming apparatus 110 receives a remote support service from the server 120 and the terminal 130. The image forming apparatus 110 may request a remote support service from the server 120 or the terminal 130, may be connected to the terminal 130, and may start the remote support service. The image forming apparatus 110 receives a request for authorization for accessing operations necessary for the remote support service from the terminal 130 and grants the authorization according to a certain criterion. Here, the certain criterion may be a user input or a preset value. Furthermore, the operations include execution of functions of the image forming apparatus 110 or access to information stored in the image forming apparatus 110. For example, the operations may include execution of functions of the image forming apparatus 110, such as power ON/OFF, activation/deactivation of a particular function, updating of a program, and access to information, such as a user profile, an address book, and a work queue list. Furthermore, the operations may include displaying of alarms instructing a user to perform manual actions, such as toner replacement, paper shortage, and the like. Next, when a control command for the remote support service is received from the terminal 130, the image forming apparatus 110 may execute an operation corresponding to the control command or may refuse to execute the operation according to access authorization granted to the terminal 130.

According to an embodiment, the image forming apparatus 110 may include a user interface, an authorization management module, and a network interface. The user interface may receive an input from a user and may output a process and a result of a remote support service and various messages to the user. The authorization management module may manage accounts and authorizations necessary for a remote support service. Furthermore, the network interface may communicate with an external device, receive a control command according to a remote support service, and transmit a screen image of the image forming apparatus 110 to the external device.

According to an embodiment, the image forming apparatus 110 may include a multi-function printer, a printer, a scanner, a facsimile, etc.

Furthermore, according to an embodiment, the image forming apparatus 110 may receive a remote support service only from the terminal 130 without the server 120. In this case, the image forming apparatus 110 may perform functions of the server 120 in the remote support service.

The server 120 may provide a remote support service to the image forming apparatus 110 together with the terminal 130. The server 120 may receive a remote support service request from the image forming apparatus 110 and notify the remote support service request to the terminal 130.

According to an embodiment, upon reception of a remote support service request from the image forming apparatus 110, the server 120 may also receive identification information regarding the image forming apparatus 110, status information regarding the image forming apparatus 110, etc. For example, the server 120 may receive a serial number of the image forming apparatus 110, an error code, etc. In this case, the server 120 may inform the terminal 130 about the serial number of the forming apparatus 110 to provide the remote support service thereto. Furthermore, the server 120 may generate a list of operations of the image forming apparatus 110 necessary for providing the remote support service, based on an error code corresponding to an error having occurred at the image forming apparatus 110. The server 120 may transmit the generated list of operations to the terminal 130.

According to an embodiment, the server 120 may include an error code management module, a connection management module, a network management module, etc. The error code management module may store error codes used in various kinds of products and measures for respective products according to the error codes. The error code management module may generate a list of operations of the image forming apparatus 110 necessary for providing remote support services for respective error codes based on the stored data. Furthermore, the network interface may communicate with an external device and transmit a list of operations or transmit and receive various service connection information.

Furthermore, according to an embodiment, it is also possible to provide a remote support service using only the terminal 130 without the server 120. In this case, the image forming apparatus 110 may perform functions of the server 120 in the remote support service.

The terminal 130 receives a remote support service request from the image forming apparatus 110 or the server 120 and requests the image forming apparatus 110 for authorization for accessing operations necessary for a remote support service. Next, the terminal 130 transmits a control command for the remote support service to the image forming apparatus 110, thereby providing the remote support service.

According to an embodiment, the terminal 130 may include a user interface, a network interface, etc. The user interface may display a list of operations to a service engineer and receive a command for editing the list of operations from the service engineer. Furthermore, the user interface may also output a screen image of the image forming apparatus 110 received from the image forming apparatus 110, various messages, etc. Furthermore, the network interface may communicate with an external device, request authorization necessary for the remote support service, transmit a control command according to the remote support service, and receive a screen image of the image forming apparatus 110.

Furthermore, according to an embodiment, the terminal 130 may be any terminal that may be connected to the network 140, such as a personal computer (PC), a laptop computer, a mobile phone, a tablet PC, etc.

The network 140 may be any network for interconnecting respective devices. According to an embodiment, the network 140 may include the Internet.

Hereinafter, a method of providing a remote support service will be described in more detail.

FIG. 2 is a flowchart showing a method of providing a remote support service according to an embodiment of the present disclosure.

Referring to FIG. 2, in operation 210, the image forming apparatus 110 requests a remote support service to the server 120. For example, when an error occurs in the image forming apparatus 110 or there is a problem with a function of the image forming apparatus 110, a remote support service is requested to address the problem. Although FIG. 2 shows that the image forming apparatus 110 requests a remote support service to the server 120, the image forming apparatus 110 may also request a remote support service to the terminal 130 or request a remote support service to the server 120 via the terminal 130.

According to an embodiment, when the image forming apparatus 110 requests a remote support service, identification information regarding the image forming apparatus 110, state information regarding the image forming apparatus 110, etc. may be transmitted together. For example, a serial number of the image forming apparatus 110, an error code, etc. may be transmitted together.

According to an embodiment, the server 120 may receive and register a remote support service requested by the image forming apparatus 110. Furthermore, the server 120 may generate a list of operations of the image forming apparatus 110 necessary for providing the remote support service, based on an error code corresponding to an error having occurred in the image forming apparatus 110. Here, the operations include execution of a function of the image forming apparatus 110 or access of information stored in the image forming apparatus 110. For example, the operations include execution of functions of the image forming apparatus 110, such as power ON/OFF, activation/deactivation of a specific function, and updating of a program, and access of information, such as a user profile, an address book, and a work queue list. Furthermore, the operations also include displaying of alarms instructing a user to perform manual actions, such as toner replacement, paper shortage, and the like.

In operation 220, the server 120 notifies the terminal 130 about the registered remote support service. For example, the server 120 informs the service engineer that the remote support service is requested. According to an embodiment, the server 120 may also inform the terminal 130 about a serial number of the forming device 110 that provides the remote support service in operation 230. Furthermore, the server 120 may transmit the list of operations of the image forming apparatus 110 necessary for providing the remote support service to the terminal 130 together.

In operation 250, the terminal 130 accesses the image forming apparatus 110 to start the remote support service. More particularly, the terminal 130 may notify the image forming apparatus 110 that the remote support service is started. After the terminal 130 notifies about the starting of the remote support service, the remote support service may be started immediately or after approval of the image forming apparatus 110. According to an embodiment, the image forming apparatus 110 may be connected to the terminal 130 and the remote support service may start.

According to an embodiment, the remote control service may be provided through virtual network computing (VNC) technology. However, the present disclosure is not limited thereto, and a remote support services may be provided by using various techniques.

In operation 260, the terminal 130 transmits a request for authorization for accessing an operation related to the remote support service to the image forming apparatus 110. According to an embodiment, the terminal 130 may transmit a list of operations related to the remote support service. Here, the list of operations may include a list of operations that the terminal 130 received from the server 120, a list of operations generated by editing the list of operations that the terminal 130 received from the server 120, a list of operations generated by the terminal 130, etc. A more detailed description thereof will be given below with reference to FIG. 5.

FIG. 5 is a diagram showing an operation list generating screen image according to an embodiment of the present disclosure.

Referring to FIG. 5, an operation list generating screen image 501 titled 'Prior Consent for Remote Support' is shown. As described above, the server 120 may generate a template-type list of operations based on an error code and transmit the generated list of operations to the terminal 130, and the terminal 130 may receive the list of operations and display the same on a display screen. As shown in FIG. 5, based on an error code, the server 120 determined that authorization is necessary to access functions or information including 'User Profile Management', 'Address Book Management', 'Admin Information Management', 'Document Box Management', 'App Management/Feature Management', 'Job Queue Management', 'universal serial bus (USB) Read Access, USB Write Access', 'Print, Copy, Fax, Scan', and 'Device Setting' and transmitted a corresponding list to the terminal 130.

The list of operations may include a serial number and an IP address to specify the image forming apparatus 110, which is a target of a remote support service, and may include a user period of authorization to be granted.

Furthermore, when an unnecessary operation is included in the list of operations or there is a further necessary operation, the terminal 130 may edit the list of operations received from the server 120. Furthermore, the terminal 130 may also generate a new list of operations.

Referring back to FIG. 2, in operation 270, the image forming apparatus 110 grants access authorization to the terminal 130 according to a user input or a pre-set setting. At this time, the image forming apparatus 110 may grant the access authorization by selecting an item to agree in the list of operations received from the terminal 130. A more detailed description thereof will be given below with reference to FIG. 6.

FIG. 6 is a diagram showing an operation list consent screen image according to an embodiment of the present disclosure.

Referring to FIG. 6, an operation list consent screen image 601 titled 'Prior Consent for Remote Support' is shown. According to an embodiment, the image forming apparatus 110 may display such a list of operations on a display screen, receive a user input, and grant the terminal 130 authorization for accessing selected operations. For example, when a user selects checkboxes for operations that the user agrees to grant authorization for accessing the operations, the terminal 130 may be granted authorization for accessing the operations. In FIG. 6, the checkboxes for 'Print, Copy, Fax, Scan', and 'Device Setting' are selected and authorization for accessing the corresponding operations are granted, but no authorization for accessing the remaining unselected operations is granted. Alternatively, the image forming apparatus 110 may grant authorization for accessing only operations pre-set by a user.

According to an embodiment, based on a user's input, the image forming apparatus 110 may agree with respect to all operations in the list of operations received from the terminal 130, may agree with respect to only some of the operations, or may disagree with respect to the all operations. When the image forming apparatus 110 disagrees with respect to all the operations in the list of operations, the terminal 130 may transmit a newly generated list of operations and request access authorization in the same manner as described above.

According to an embodiment, the image forming apparatus 110 transmits an identification (ID) and a password (PW) of an account corresponding to the access authorization granted in operation 270 according to a user input or a pre-set setting to the terminal 130 or the server 120, thereby authorizing the terminal 130 or the server 120 to access operations. Although not shown in FIG. 2, in this case, the image forming apparatus 110 may receive a security token from the terminal 130, transmit the security token to the server 120, verify the security token, and grant access authorization to a corresponding account. Here, the security token is issued by the server 120 with respect to a particular account and may include a security token that the terminal 130 received from the server 120.

When a security token is used, access authorization set with respect to a particular account is granted, and thus a service engineer may provide a remote control service by using the corresponding account without a separate process for authorization whenever necessary.

In operation 280, the terminal 130 transmits a control command for the remote support service to the image forming apparatus 110, and, in operation 290, the image forming apparatus 110 that received the control command may execute an operation corresponding to the control command according to access authorization granted to the terminal 130. For example, the terminal 130 may transmit a control command for turning the image forming apparatus 110 OFF and ON, and the image forming apparatus 110 that received the control command may perform an operation for turning the image forming apparatus 110 OFF and ON.

Furthermore, according to an embodiment, the image forming apparatus 110 may receive a remote support service only from the terminal 130 without the server 120. In this case, the image forming apparatus 110 may perform functions of the server 120 in the remote support service. For example, the image forming apparatus 110 may transmit a list of operations of the image forming apparatus 110 necessary for providing a remote support service to the terminal 130 based on an error code occurring in the image forming apparatus 110.

As described above, by granting access authorization regarding selected operations only, leakage of personal information and malicious remote support may be prevented.

FIG. 3 is a flowchart showing a method of controlling an image forming apparatus according to an embodiment of the present disclosure.

Referring to FIG. 3, in operation 310, the image forming apparatus 110 requests a remote support service to the terminal 130 or the server 120 connected to the terminal 130. When an error occurs in the image forming apparatus 110 or there is a problem with a function, a remote support service is requested to address the problem.

According to an embodiment, when the image forming apparatus 110 requests a remote support service, identification information regarding the image forming apparatus 110, status information regarding the image forming apparatus 110, etc. may be transmitted together. For example, a serial number of the image forming apparatus 110, an error code, etc. may be transmitted together.

In operation 320, the image forming apparatus 110 receives a request for authorization to access an operation related to the remote support service from the terminal 130. According to an embodiment, the terminal 130 may receive a list of operations related to the remote support service. Here, the list of operations may include a list of operations that the terminal 130 received from the server 120, a list of operations generated by editing the list of operations that the terminal 130 received from the server 120, a list of operations generated by the terminal 130, etc. A more detailed description thereof will be given below with reference to FIG. 5.

In operation 330, the image forming apparatus 110 grants access authorization to the terminal 130 according to a user input or a pre-set setting. According to an embodiment, the image forming apparatus 110 may grant access authorization by selecting an item to agree in the list of operations received from the terminal 130. A more detailed description thereof will be given below with reference to FIG. 6.

The image forming apparatus 110 grants access authorization to the terminal 130 according to user input or pre-stored settings. According to an embodiment, the image forming apparatus 110 may grant the access authorization by selecting an item to agree on from the operation list received from the terminal 130. For example, as shown in FIG. 6, when a user selects checkboxes for operations that the user agrees to grant authorization for accessing the operations, the terminal 130 may be granted authorization for accessing the corresponding operations.

According to an embodiment, based on a user's input, the image forming apparatus 110 may agree with respect to all operations in the list of operations received from the terminal 130, may agree with respect to only some of the operations, or may disagree with respect to the all operations. When the image forming apparatus 110 disagrees with respect to the all operations in the list of operations, the terminal 130 may transmit a newly generated list of operations and request access authorization in the same manner as described above.

According to an embodiment, the image forming apparatus 110 transmits an ID and a password (PW) of an account corresponding to the access authorization granted in operation 270 according to a user input or a pre-set setting to the terminal 130 or the server 120, thereby authorizing the terminal 130 or the server 120 to access operations. Although not shown in FIG. 3, in this case, the image forming apparatus 110 may receive a security token from the terminal 130, transmit the security token to the server 120, get the security token verified, and grant access authorization to a corresponding account. Here, the security token is issued by the server 120 with respect to a particular account and may include a security token that the terminal 130 received from the server 120.

When a security token is used, access authorization set with respect to a particular account is granted, and thus a service engineer may provide a remote control service by using the corresponding account without a separate process for authorization whenever necessary.

In operation 340, the image forming apparatus 110 may receive a control command for the remote support service from the terminal 130, and, in operation 350, the image forming apparatus 110 may execute an operation corresponding to the control command according to access authorization granted to the terminal 130. A more detailed description thereof will be given below with reference to FIG. 4.

FIG. 4 is a flowchart showing a method by which an image forming apparatus executes an operation corresponding to a control command according to an embodiment of the present disclosure.

Referring to FIG. 4, in operation 410, the image forming apparatus 110 checks the security level of an operation corresponding to a control command. The security level may be classified into a first level at which a corresponding operation may be accessed unlimitedly without access authorization, a second level at which a corresponding operation may be accessed only with access authorization, and a third level at which a corresponding operation may not be accessed. However, classification of security levels is not limited thereto, and security levels may be classified according to various criteria.

Operations corresponding to the first level that may be accessed by the terminal 130 unlimitedly without access authorization may include the least of necessary information for basic services, e.g., basic device status information, a list of errors, and information regarding usage of expendable supplies, etc.

Operations corresponding to the second level that may be accessed by the terminal 130 only with access authorization may include operations for accessing personal information to be protected, e.g., a user profile, an address book, administrator information, etc. Furthermore, the operations corresponding to the second level may also include operations for accessing a document box, application-related information, a work queue, USB read/write, print/copy/fax/scan, device configuration, etc.

Operations corresponding to the third level that may not be accessed by the terminal 130 may include operations such as an memory clearing operation, hard disk drive formatting operation, device initializing operation, administrator password changing operation, network setting operation, hard drive encrypting operation, etc.

In operation 410, when the security level of an operation corresponding to the control command corresponds to the first level at which the operation may be unlimitedly accessed, the image forming apparatus 110 checks the expiration date of a remote support service in operation 430. When it is determined in the operation 430 that the expiration date has expired, the remote support service is terminated. When it is determined in operation 430 that the expiration date has not expired, the process proceeds to operation 450 and the operation corresponding to the control command is executed.

When the security level of the operation corresponding to the control command corresponds to the second level at which the operation may be accessed only with access authorization, the image forming apparatus 110 determines whether there is a corresponding access authorization in operation 420. When it is determined in operation 420 that there is the corresponding access authorization, the image forming apparatus 110 checks the expiration date of the remote support service in operation 430. When it is determined in operation 430 that the expiration date has expired, the remote support service is terminated. If it is determined in operation 430 that the expiration date has not expired, the process proceeds to operation 450 and the operation corresponding to the control command is executed. When it is determined in operation 420 that there is no corresponding access authorization, the process proceeds to operation 440 and execution of the corresponding operation is refused.

When it is determined in operation 410 that the security level of the operation corresponding to the control command corresponds to the third level at which the operation may not be accessed, the process directly proceeds to operation 440 and the image forming apparatus 110 refuses to execute the operation.

Operation 430 of FIG. 4, that is, the operation for checking the expiration date of a remote support service may be selectively included. Alternatively, an operation may be executed or execution of the operation may be refused based on a security level and access authorization only.

Figure 7:
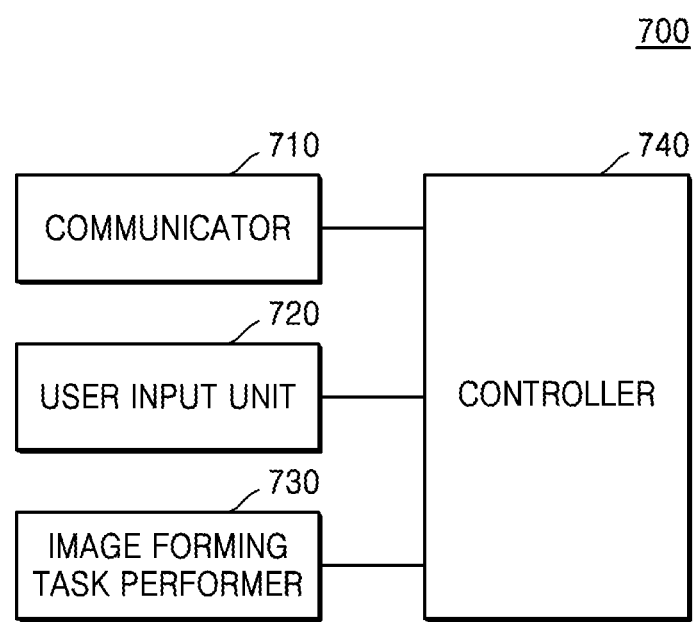
FIG. 7 is a diagram showing an internal configuration of an image forming apparatus according to an embodiment of the present disclosure.

FIG. 7 is a diagram showing an internal configuration of an image forming apparatus according to an embodiment of the present disclosure.

Referring to FIG. 7, an image forming apparatus 700 includes a communicator (e.g., a transceiver) 710, a user input unit (e.g., a touchscreen) 720, an image forming task performer 730, and a controller (e.g., a processor) 740.

The communicator 710 communicates with an external device. The communicator 710 may be connected to a network via a wire or wirelessly and communicate with an external device. According to an embodiment, the communicator 710 may communicate with the server 120 and the terminal 130 and may transmit and receive data to and from the server 120 and the terminal 130. For example, the communicator 710 may include a short-range communication module, a mobile communication module, a wireless Internet module, a wired Internet module, etc. Furthermore, the communicator 710 may include one or more components.

The user input unit 720 receives a user input for the image forming apparatus 700. According to an embodiment, the user input 720 may receive a selection of operations related to a remote assistance service. For example, the user input unit 720 may include, but is not limited to, a touch screen and a physical key.

The image forming task performer 730 performs an image forming job under the control of the controller 740.

The controller 740 controls the overall operation of the image forming apparatus 700 and may selectively grant access authorization to the terminal 130 by controlling the communicator 710, the user input unit 720, and the image forming task performer 730. The controller 740 may include a RAM that stores signals or data input from the outside of the image forming apparatus 700 or is used as a storage area corresponding to various operations performed in the image forming apparatus 700, a ROM that stores a control program for controlling a peripheral device, and a processor. The processor may be implemented as a system-on-chip (SoC) in which a core (not shown) and a graphics processing unit (GPU) (not shown) are integrated with each other. The processor may also include a plurality of processors.

According to an embodiment, the controller 740 requests a remote support service to the terminal 130 or the server 120 connected to the terminal 130, receives a request for access authorization to access an operation related to the remote support service, grants access authorization to the terminal 130 based on a user input or a pre-set setting, receives a control command for the remote support service from the terminal 130, and controls the image forming apparatus 700 to execute an operation corresponding to the control command according to the access authorization granted to the terminal 130.

Furthermore, the controller 740 may receive a list of operations related to the remote support service from the terminal 130 by controlling the communicator 710. Here, the list of operations may include at least one or more of a list of operations that the terminal 130 received from the server 120, a list of operations generated by editing the list of operations that the terminal 130 received from the server 120, and a list of operations generated by the terminal 130.

The controller 740 may transmit status information regarding the image forming apparatus 700 to the terminal 130 or the server 120 by controlling the communicator 710. Furthermore, the controller 740 may check the security level of an operation corresponding to a control command and may execute the operation corresponding to the control command based on at least one of the security level and availability of access authorization granted to the terminal 130. Here, the security level may include a first level at which a corresponding operation may be accessed unlimitedly without access authorization, a second level at which a corresponding operation may be accessed only with access authorization, and a third level at which a corresponding operation may not be accessed.

Furthermore, the controller 740 may transmit an ID and a password (PW) of an account corresponding to access authorization granted according to a user input or a pre-set setting to the terminal 130 or the server 120 by controlling the communicator 710. The controller 740 may control the communicator 710 to receive a security token from the terminal 130, transmit the security token to the server 120, and get the security token verified. Here, the security token is issued by the server 120 with respect to a particular account and may include a security token that the terminal 130 received from the server 120.

Furthermore, the controller 740 may check the expiration date of a remote support service and, when the expiration date has expired, may terminate the remote support service.

Figure 8:
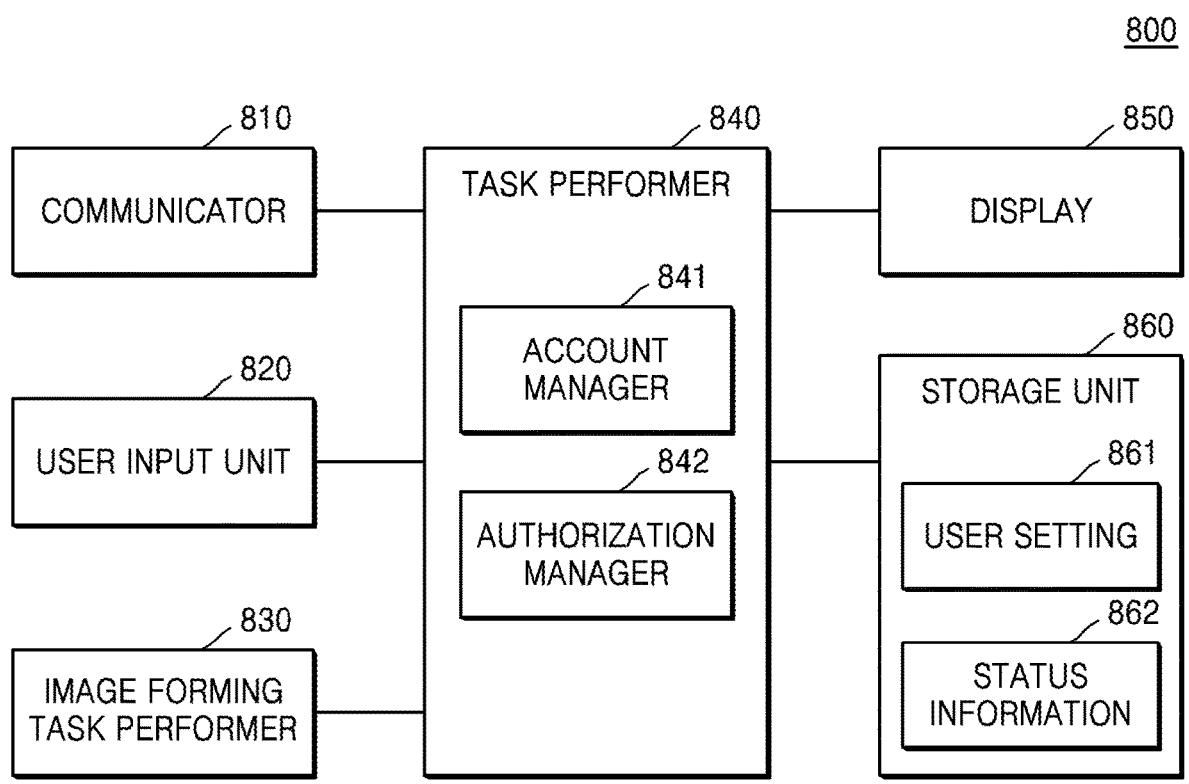
FIG. 8 is a diagram showing an internal configuration of an image forming apparatus according to an embodiment of the present disclosure.

FIG. 8 is a diagram showing an internal configuration of an image forming apparatus according to an embodiment of the present disclosure.

Referring to FIG. 8, an image forming apparatus 800 may include a communicator (e.g., transceiver) 810, a user input unit (e.g., touchscreen) 820, an image forming task performer 830, and a controller (e.g., processor) 840, which are respectively identical to the communicator 710, the user input unit 720, the image forming task performer 730, and the controller 740, and thus a detailed description thereof will be omitted.

The controller 840 may include an account manager 841 and an authorization manager 842. The account manager 841 manages a user account of the image forming apparatus 800. According to an embodiment, the account manager 841 may create and manage an account for a remote assistance service. The authorization manager 842 may manage access authorizations of respective accounts.

A display 850 may display a process and a result of providing a remote support service and various messages to a user.

A storage unit 860 stores data and programs necessary for operations of the image forming apparatus 800. The storage unit 860 may include at least one recording medium from among a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), an electrically erasable programmable ROM (EE- PROM), a programmable ROM (PROM), a magnetic memory, a magnetic disk, and an optical disc.

According to an embodiment, the storage unit 860 may store a user setting 861 for granting authorization and status information 862 regarding the image forming apparatus 800.

The above-described embodiments may be implemented as a program that may be executed by a computer and may be implemented in a general-purpose digital computer that executes a program by using a computer-readable recording medium.

Examples of the computer readable recording medium include magnetic storage media (e.g., a ROM, a floppy disk, a hard disk, or the like) and optical reading media (e.g., a compact disk ROM (CD ROM), a digital versatile disc (DVD) or the like).

It should be understood that various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling an image forming apparatus, the method comprising:
   determining an occurrence of an error in the image forming apparatus;
   in response to the determining of the occurrence of the error, requesting, by the image forming apparatus, a remote support service from a terminal or a server connected to the terminal, wherein the requesting of the remote support service includes transmitting status information regarding the image forming apparatus;
   receiving, at the image forming apparatus, from the terminal or the server connected to the terminal, a list of operations of the image forming apparatus and a request for authorization to access one or more operations from the list of operations of the image forming apparatus, wherein the list of operations is determined by the terminal or the server connected to the terminal based on the transmitted status information regarding the image forming apparatus;
   displaying, at the image forming apparatus, the received list of operations for selection of the one or more operations by a user;
   receiving a user input selecting the one or more operations from the list of operations;
   granting, by the image forming apparatus, the requested authorization to the terminal or the server connected to the terminal to access the one or more operations based on the user input;
   receiving, at the image forming apparatus, from the terminal or the server connected to the terminal, a control command for the remote support service; and
   executing the one or more operations corresponding to the control command according to the access authorization granted to the terminal or the server connected to the terminal.

2. The method of claim 1, wherein the list of operations comprises at least one of a list of operations that the terminal received from the server, a list of operations generated by the terminal, editing the list of operations that the terminal received from the server, or a list of operations generated by the terminal.

3. The method of claim 1, wherein the executing of the one or more operations corresponding to the control command comprises:
   determining a security level of the one or more operations corresponding to the control command; and
   executing the one or more operations corresponding to the control command based on at least one of the security level or availability of the access authorization of the terminal.

4. The method of claim 3, wherein the security level comprises at least one of a first level at which a corresponding operation is accessible without a time limit and without the access authorization, a second level at which the corresponding operation is accessible only with the access authorization, or a third level at which the corresponding operation is not accessible.

5. The method of claim 1, wherein the granting of the requested authorization comprises:
   transmitting an identification (ID) and a password (PW) of an account corresponding to the access authorization granted according to the user input to the terminal or the server.

6. The method of claim 5, wherein the granting of the requested authorization comprises:
   receiving a security token from the terminal; and
   transmitting the security token to the server to get the security token verified,
   wherein the security token is issued by the server with respect to the account and was received by the terminal from the server.

7. The method of claim 1, further comprising: determining, by the image forming apparatus, an expiration date of the remote support service; and when the expiration date of the remote support service has expired, terminating the remote support service.

8. The method of claim 1, wherein the transmitting of the status information regarding the image forming apparatus comprises transmitting an error code corresponding to the error.

9. The method of claim 8, wherein the list of operations is determined by the terminal or the server connected to the terminal based on the error code.

10. An image forming apparatus comprising:
    a transceiver to communicate with an external device; and
    at least one processor to:
    determine an occurrence of an error in the image forming apparatus,
    in response to the determining of the occurrence of the error, request, by the image forming apparatus, a remote support service from a terminal or a server connected to the terminal, wherein the requesting of the remote support service includes transmitting status information regarding the image forming apparatus,
    receive, at the image forming apparatus, from the terminal or the server connected to the terminal, a list of operations of the image forming apparatus and a request for authorization to access one or more operations from the list of operations of the image forming apparatus, wherein the list of operations is determined by the terminal or the server connected to the terminal based on the transmitted status information regarding the image forming apparatus,
    display, at the image forming apparatus, the received list of operations for selection of the one or more operations by a user, receive a user input selecting the one or more operations from the list of operations, grant, by the image forming apparatus, the requested authorization to the terminal or the server connected to the terminal to access the one or more operations based on the user input, receive, at the image forming apparatus, from the terminal or the server connected to the terminal, a control command for the remote support service, control the image forming apparatus to execute the one or more operations corresponding to the control command according to the access authorization granted to the terminal or the server connected to the terminal, and perform an image forming operation.

11. The image forming apparatus of claim 10, wherein the list of operations comprises at least one of a list of operations that the terminal received from the server, a list of operations generated by editing the list of operations that the terminal received from the server, or a list of operations generated by the terminal.

12. The image forming apparatus of claim 10, wherein the at least one processor:
    determines a security level of the one or more operations corresponding to the control command, and
    executes the one or more operations corresponding to the control command based on at least one of the security level or an availability of the access authorization of the terminal.

13. The image forming apparatus of claim 12, wherein the security level comprises at least one of a first level at which a corresponding operation is accessible without a time limit and without the access authorization, a second level at which a corresponding operation is accessible only with the access authorization, or a third level at which a corresponding operation is not accessible.

14. The image forming apparatus of claim 10, wherein the at least one processor controls the transceiver to transmit an identification (ID) and a password (PW) of an account corresponding to the access authorization granted according to the user input to the terminal or the server.

15. The image forming apparatus of claim 14,
    wherein the at least one processor controls the transceiver to receive a security token from the terminal and transmit the security token to the server to get the security token verified, and
    wherein the security token is issued by the server with respect to the account and was received by the terminal from the server.

16. The image forming apparatus of claim 10, wherein the at least one processor:
    determines an expiration date of the remote support service, and
    when the expiration date of the remote support service has expired, terminates the remote support service.

17. The image forming apparatus of claim 10, wherein the transmitting of the status information regarding the image forming apparatus comprises transmitting an error code corresponding to the error.

18. The image forming apparatus of claim 17, wherein the list of operations is determined by the terminal or the server connected to the terminal based on the error code.

19. A non-transitory computer readable recording medium having instructions recorded thereon for controlling an image forming apparatus, the computer readable recording medium comprising:
    instructions to determine an occurrence of an error in the image forming apparatus;
    instructions to, in response to the determining of the occurrence of the error, request, by the image forming apparatus, a remote support service from a terminal or a server connected to the terminal, wherein the instructions to request the remote support service include instructions to transmit status information regarding the image forming apparatus;
    instructions to receive, at the image forming apparatus, from the terminal or the server connected to the terminal, a list of operations of the image forming apparatus and a request for authorization to access one or more operations from the list of operations of the image forming apparatus, wherein the list of operations is determined by the terminal or the server connected to the terminal based on the transmitted status information regarding the image forming apparatus;
    instructions to display, at the image forming apparatus, the received list of operations for selection of the one or more operations by a user;
    instructions to receive a user input selecting the one or more operations from the list of operations;
    instructions to grant, by the image forming apparatus, the requested authorization to the terminal or the server connected to the terminal to access the one or more operations based on the user input;
    instructions to receive, at the image forming apparatus, from the terminal or the server connected to the terminal, a control command for the remote support service; and
    instructions to execute the one or more operations corresponding to the control command according to the access authorization granted to the terminal or the server connected to the terminal.

20. The computer readable recording medium of claim 19, wherein the instructions to transmit the status information regarding the image forming apparatus comprise instructions to transmit an error code corresponding to the error.

* * * * *